(12) United States Patent
Herring et al.

(10) Patent No.: US 11,926,324 B2
(45) Date of Patent: Mar. 12, 2024

(54) APPARATUS, METHOD AND COMPUTER PROGRAM FOR CONTROLLING A VEHICLE

(71) Applicant: JAGUAR LAND ROVER LIMITED, Warwickshire (GB)

(72) Inventors: Jonathan Herring, Coventry (GB); Thomas Valero, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 17 days.

(21) Appl. No.: 17/569,054

(22) Filed: Jan. 5, 2022

(65) Prior Publication Data

US 2022/0126828 A1 Apr. 28, 2022

Related U.S. Application Data

(63) Continuation of application No. 16/482,001, filed as application No. PCT/EP2018/051527 on Jan. 23, 2018, now Pat. No. 11,247,681.

(30) Foreign Application Priority Data

Feb. 1, 2017 (GB) ..................................... 1701627

(51) Int. Cl.
*G06F 7/70* (2006.01)
*B60W 10/02* (2006.01)
(Continued)

(52) U.S. Cl.
CPC ...... *B60W 30/18072* (2013.01); *B60W 10/02* (2013.01); *B60W 10/04* (2013.01);
(Continued)

(58) Field of Classification Search
CPC ........... B60W 30/18072; B60W 10/02; B60W 10/04; B60W 10/18; B60W 2030/1809;
(Continued)

(56) References Cited

U.S. PATENT DOCUMENTS 9,540,004 B2 * 1/2017 Kim ..................... B60W 10/02
2011/0136620 A1 6/2011 Gibson et al.
(Continued)

FOREIGN PATENT DOCUMENTS

EP 2718160 A1 4/2014
EP 2789833 A1 10/2014
(Continued)

OTHER PUBLICATIONS

Combined Search and Examination Report under Sections 17 and 18(3) for Application No. GB1701627.0 dated Jul. 28, 2017.
(Continued)

*Primary Examiner* — Adam M Alharbi
(74) *Attorney, Agent, or Firm* — Carlson, Gaskey & Olds, P.C.

(57) ABSTRACT

A method for controlling connection of a driveline within a vehicle includes detecting a deceleration and/or a brake demand while the vehicle is operating in a coasting mode and the vehicle speed is above a threshold speed, determining whether the driveline can be reconnected within a
(Continued)

threshold time, and controlling the driveline so that the driveline is not reconnected if the driveline cannot be reconnected within the threshold time.

19 Claims, 6 Drawing Sheets

(51) Int. Cl.
  *B60W 10/04* (2006.01)
  *B60W 10/18* (2012.01)
  *B60W 30/18* (2012.01)

(52) U.S. Cl.
  CPC ..... *B60W 10/18* (2013.01); *B60W 2030/1809* (2013.01); *B60W 2520/10* (2013.01); *B60W 2710/021* (2013.01); *B60W 2710/18* (2013.01); *B60W 2720/106* (2013.01)

(58) Field of Classification Search
  CPC ....... B60W 2520/10; B60W 2710/021; B60W 2710/18; B60W 2720/106
  See application file for complete search history.

(56) References Cited

U.S. PATENT DOCUMENTS

| | | |
|---|---|---|
| 2017/0349179 A1 | 12/2017 | Cunningham et al. |
| 2018/0265090 A1 | 9/2018 | Sharma et al. |
| 2020/0086872 A1 | 3/2020 | Tamai et al. |

FOREIGN PATENT DOCUMENTS

| | | |
|---|---|---|
| EP | 3263941 A1 | 1/2018 |
| KR | 20170107244 A | 9/2017 |
| WO | 2015/046616 A1 | 4/2015 |
| WO | 2016/136874 A1 | 9/2016 |

OTHER PUBLICATIONS

International Search Report and Written Opinion of the International Searching Authority for International application No. PCT/EP2018/051527 dated Aug. 1, 2018.
Search Report under Section 17(6) for Application No. GB1701627.0 dated Apr. 5, 2018.
Examination Report under Section 18(3) for Application No. GB1701627.0 dated May 2, 2019.

\* cited by examiner

APPARATUS, METHOD AND COMPUTER PROGRAM FOR CONTROLLING A VEHICLE

CROSS REFERENCE TO RELATED APPLICATION

This application is a continuation of U.S. patent application Ser. No. 16/482,001, filed Jul. 30, 2019, which is the national stage application of PCT/EP2018/051527, filed Jan. 23, 2018, which claims priority to Great Britain Application No. 1701627.0, filed Feb. 1, 2017.

TECHNICAL FIELD

The present disclosure relates to an apparatus, a method and a computer program for controlling a vehicle. In particular, but not exclusively it relates to an apparatus, method and computer program for controlling a vehicle during a transition between a coasting mode and a stop on the move mode.

Aspects of the invention relate to an apparatus, method, computer program and vehicle.

BACKGROUND

In order to increase fuel efficiency of a vehicle the vehicle may be arranged into a sailing mode in which the vehicle's prime mover is disconnected from the driveline. This may increase the fuel efficiency of the vehicle because in such modes the prime mover does not act as a brake on the vehicle.

Different sailing modes, such as coasting and stop on the move (SOTM), may be available for different conditions of the vehicle. In some vehicles a coasting mode may be used when the vehicle is above a threshold speed. In the coasting mode neither the accelerator nor brake pedal are pressed by the driver. A SOTM mode may be used if the vehicle is travelling below a threshold speed and the brake pedal is pressed by the driver.

If the actuation of the brake pedal is detected when the vehicle is in a coasting mode the driveline may be reconnected. The driveline may then need to be disconnected when the vehicle speed has reduced and the vehicle enters the SOTM move mode. The reconnection and disconnection of the driveline may increase fuel consumption of the vehicle and cause drivability issues for the driver.

It is an aim of the present invention to improve the transition from a coasting mode to an SOTM mode.

SUMMARY OF THE INVENTION

Aspects and embodiments of the invention provide an apparatus, a method and a computer program as claimed in the appended claims.

According to an aspect of the present invention there is provided a method of controlling connection of a driveline within a vehicle. The method includes detecting a deceleration and/or brake demand while the vehicle is operating in a coasting mode in which the driveline is disconnected and the vehicle speed is above a threshold speed, determining whether the driveline can be reconnected within a threshold time and controlling the driveline so that the driveline is not reconnected if it is determined that the driveline cannot be reconnected within the threshold time.

The driveline may be controlled so that the driveline is reconnected if it is determined that the driveline can be reconnected within the threshold time.

The threshold time may be the time taken for the vehicle speed to reduce to the threshold speed.

Determining whether the driveline can be reconnected within the threshold time may include obtaining information indicative of a current brake demand, obtaining information indicative of current vehicle speed, using the obtained information indicative of the current brake demand and the current vehicle speed to determine the time taken for the vehicle speed to reduce to the threshold speed and comparing the time taken to reduce to the threshold speed to the time taken to reconnect the driveline.

Determining whether the driveline can be reconnected within the threshold time may include obtaining information indicative of a current deceleration, obtaining information indicative of current vehicle speed, using the obtained information indicative of the current deceleration and the current vehicle speed to determine the time taken for the vehicle speed to reduce to the threshold speed and comparing the time taken to reduce to the threshold speed to the time taken to reconnect the driveline.

The threshold time may be a default threshold time, optionally the default threshold time is dependent upon the vehicle speed.

Reconnection of the driveline may be initiated before it is determined whether the driveline can be reconnected within the threshold time and if it is determined that the driveline cannot be reconnected within the threshold time the reconnection of the driveline is terminated.

The method may further include detecting a change in the brake demand and in response to detecting the change in the brake demand making a new determination whether the driveline can be reconnected within a threshold time.

The vehicle may be controlled to use a stop on the move mode of operation when below the threshold speed.

The threshold time may be a first time period associated with decelerating the vehicle to the threshold speed, and the step of determining may comprise comparing the threshold time with a second time period associated with reconnecting the driveline. The first time period may include a calculated time for decelerating the vehicle to the threshold speed and also a time buffer. The first time period may be updated continuously or periodically during the deceleration to account for differences in the deceleration rate with respect to time. The second time period may include a calculated time reconnecting the driveline and also a time buffer.

A result of the method may be to transition directly from the coasting mode to a stop on the move mode when it is determined that the time period associated with decelerating the vehicle to the threshold speed is less than the time period associated with reconnecting the driveline, wherein the coasting mode is a mode in which the driveline is disconnected while neither the accelerator nor the brake pedal are pressed by the driver and the stop on the move mode is a mode in which the driveline is disconnected while the vehicle speed is below the threshold speed and the brake pedal is depressed by the driver.

According to another aspect of the invention there is provided another method of controlling connection of a driveline within a vehicle. The method includes detecting a deceleration and/or brake demand while the vehicle is operating in a coasting mode in which the driveline is disconnected and the vehicle speed is above a threshold speed, determining the vehicle's deceleration, determining a threshold deceleration, determining whether the vehicle's deceleration is greater or less than the threshold deceleration, and controlling the driveline so that the driveline is not reconnected if the vehicle's deceleration is greater than the threshold deceleration.

The driveline may be controlled so that the driveline is reconnected if it is determined that the vehicle's deceleration is less than the threshold deceleration.

The threshold deceleration may be a default threshold deceleration, optionally the default threshold deceleration is dependent upon the vehicle speed.

The reconnection of the driveline may be initiated before it is determined whether the vehicle's deceleration is greater or less than the threshold deceleration and if it is determined that the vehicle's deceleration is less than the threshold deceleration the reconnection of the driveline is terminated.

The method may further include detecting a change in the brake demand and in response to detecting the change in the brake demand making a new determination of whether vehicle's deceleration is greater or less than the threshold deceleration.

The vehicle may be controlled to use a stop on the move mode of operation when below the threshold speed.

According to an aspect of the present invention there is provided an apparatus for controlling connection of a driveline within a vehicle. The apparatus includes means for detecting a deceleration and/or brake demand while the vehicle is operating in a coasting mode in which the driveline is disconnected and the vehicle speed is above a threshold speed, means for determining whether the driveline can be reconnected within a threshold time, means for controlling the driveline so that the driveline is not reconnected if it is determined that the driveline cannot be reconnected within the threshold time.

According to an aspect of the present invention there may be provided an apparatus to control connection of a driveline within a vehicle. The apparatus including an electronic processor having an electrical input for receiving said one or more signals each indicative of one or more of deceleration and/or brake demand while the vehicle is operating in a coasting mode in which the driveline is disconnected and the vehicle speed is above a threshold speed, an electronic memory device electrically coupled to the electronic processor and having instructions stored therein, the electronic processor being configured to access the memory device and execute the instructions stored therein such that the driveline is not reconnected if it is determined that the driveline cannot be reconnected within the threshold time.

The means for controlling the driveline or electronic processor may be configured so that the driveline is reconnected if it is determined that the driveline can be reconnected within the threshold time.

The threshold time may be the time taken for the vehicle speed to reduce to a threshold speed.

The means for determining whether the driveline can be reconnected within the threshold time may include means for obtaining information indicative of a current brake demand, means for obtaining information indicative of current vehicle speed, means for using the obtained information indicative of the current brake demand and the current vehicle speed to determine the time taken for the vehicle speed to reduce to the threshold speed, and means for comparing the time taken to reduce to the threshold speed to the time taken to reconnect the driveline.

The means for determining whether the driveline can be reconnected within the threshold time may include means for obtaining information indicative of a current deceleration, means for obtaining information indicative of the current vehicle speed, means for using the obtained information indicative of the current deceleration and the current vehicle speed to determine the time taken for the vehicle speed to reduce to the threshold speed and means for comparing the time taken to reduce to the threshold speed to the time taken to reconnect the driveline.

The threshold time may be a default threshold time, optionally the default threshold time is dependent upon the vehicle speed.

The means for controlling the driveline may be arranged so that the reconnection of the driveline is initiated before it is determined whether the driveline can be reconnected within the threshold time and if it is determined that the driveline cannot be reconnected within the threshold time the reconnection of the driveline is terminated.

The apparatus may further comprise means for detecting a change in the brake demand or receiving a signal indicative of a change in the brake demand and in response to detecting the change in the brake demand or receiving the signal respectively making a new determination whether the driveline can be reconnected within a threshold time.

The vehicle may be controlled to use a stop on the move mode of operation when below the threshold speed.

According to another aspect of the present invention there is provided an apparatus for controlling connection of a driveline within a vehicle. The apparatus comprising means for detecting a deceleration and/or brake demand while the vehicle is operating in a coasting mode in which the driveline is disconnected and the vehicle speed is above a threshold speed, means for determining the vehicle's deceleration, means for determining a threshold deceleration, means for determining whether the vehicle's deceleration is greater or less than the threshold deceleration and means for controlling the driveline so that the driveline is not reconnected if the vehicle's deceleration is greater than the threshold deceleration.

The means for controlling the driveline may cause the driveline to be reconnected if it is determined that the vehicle's deceleration is less than the threshold deceleration.

The threshold deceleration may be a default threshold deceleration, optionally the default threshold deceleration is dependent upon the vehicle speed.

The means for controlling the driveline may be arranged so that the reconnection of the driveline is initiated before it is determined whether the vehicle's deceleration is greater or less than the threshold deceleration and if it is determined that the vehicle's deceleration is less than the threshold deceleration the reconnection of the driveline is terminated.

The apparatus may further include means for detecting a change in the brake demand and in response to detecting the change in the brake demand making a new determination of whether vehicle's deceleration is greater or less than the threshold deceleration.

The apparatus may be configured to cause the vehicle to use a stop on the move mode of operation when below the threshold speed.

According to an aspect of the present invention there may be provided an apparatus to control connection of a driveline within a vehicle. The apparatus including an electronic processor having an electrical input for receiving one or more signals each indicative of one or more of deceleration and/or brake demand while the vehicle is operating in a coasting mode in which the driveline is disconnected and the vehicle speed is above a threshold speed, an electronic memory device electrically coupled to the electronic processor and having instructions stored therein, the electronic processor being configured to access the memory device and execute the instructions stored therein such that the driveline is not reconnected if it is determined that the driveline cannot be reconnected within the threshold time.

The electronic processor may be configured so that the driveline is reconnected if it is determined that the driveline can be reconnected within the threshold time.

The threshold time may be the time taken for the vehicle speed to reduce to a threshold speed.

The electronic processor may include at least one input to receive information indicative of a current brake demand and information indicative of current vehicle speed, and be configured to determine the time taken for the vehicle speed to reduce to the threshold speed based on the information indicative of the current brake demand and the current vehicle speed and compare the time taken to reduce to the threshold speed to the time taken to reconnect the driveline.

The electronic processor may include at least one input to receive information indicative of a current deceleration and information indicative of the current vehicle speed, and be configured to determine the time taken for the vehicle speed to reduce to the threshold speed based on the information indicative of the current deceleration and the current vehicle speed and compare the time taken to reduce to the threshold speed to the time taken to reconnect the driveline.

The threshold time may be a default threshold time, optionally the default threshold time is dependent upon the vehicle speed.

The electronic processor may be configured to initiate reconnection of the driveline before it is determined whether the driveline can be reconnected within the threshold time and if it is determined that the driveline cannot be reconnected within the threshold time terminate the reconnection of the driveline.

The electronic processor may include an input to receive a signal indicating a change in the brake demand and in response to receiving the signal initiating a new determination whether the driveline can be reconnected within a threshold time.

The electronic processor may be configured to control the vehicle to use a stop on the move mode of operation when below the threshold speed.

According to an aspect of the present invention there may be provided an apparatus to control connection of a driveline within a vehicle. The apparatus including an electronic processor having an electrical input for receiving one or more signals each indicative of one or more of deceleration and/or brake demand while the vehicle is operating in a coasting mode in which the driveline is disconnected and the vehicle speed is above a threshold speed. The electronic processor being configured to determine a threshold deceleration, determine whether the vehicle's deceleration is greater or less than the threshold deceleration and control the driveline so that the driveline is not reconnected if the vehicle's deceleration is greater than the threshold deceleration.

The electronic processor may control the driveline so that the driveline is reconnected if it is determined that the vehicle's deceleration is less than the threshold deceleration.

The threshold deceleration may be a default threshold deceleration, optionally the default threshold deceleration is dependent upon the vehicle speed.

The electronic processor may be configured to initiate reconnection of the driveline before it is determined whether the vehicle's deceleration is greater or less than the threshold deceleration and if it is determined that the vehicle's deceleration is less than the threshold deceleration terminate the reconnection of the driveline.

The electronic processor may be configured to receive a signal indicating a change in the brake demand and in response to detecting the change in the brake demand making a new determination of whether vehicle's deceleration is greater or less than the threshold deceleration.

The vehicle having the apparatus may be controlled to use a stop on the move mode of operation when below the threshold speed.

According to an aspect of the present invention there is provided a vehicle comprising an apparatus as described above.

According to an aspect of the present invention there is provided a computer program for enabling control of a vehicle. The computer program comprises instructions that, when executed by one or more processors, cause a system to perform, at least detection of a deceleration and/or brake demand while the vehicle is operating in a coasting mode in which the driveline is disconnected and the vehicle speed is above a threshold speed, a determination of whether the driveline can be reconnected within a threshold time, control of the driveline so that the driveline is not reconnected if it is determined that the driveline cannot be reconnected within the threshold time.

According to another aspect of the present invention there is provided a computer program for enabling control of a vehicle. The computer program comprises instructions that, when executed by one or more processors, cause a system (33) to perform, at least: detection of a deceleration and/or brake demand while the vehicle is operating in a coasting mode in which the driveline is disconnected and the vehicle speed is above a threshold speed, a determination of the vehicle's deceleration, a threshold deceleration and whether the vehicle's deceleration is greater or less than the threshold deceleration and control of the driveline so that the driveline is not reconnected if the vehicle's deceleration is greater than the threshold deceleration.

According to an aspect of the present invention there is provided a non-transitory computer readable media comprising a computer program as described above.

According to an aspect of the invention there is provided a method of controlling connection of a driveline within a vehicle, the method comprising: detecting application of a braking force while the vehicle is operating in a coasting mode in which the driveline is disconnected and the vehicle speed is above a threshold speed; determining whether the driveline can be reconnected within a threshold time; controlling the driveline so that the driveline is not reconnected if it is determined that the driveline cannot be reconnected within the threshold time.

Embodiments of the invention provide the advantage that the driveline is not reconnected in the coasting mode only to be disconnected in the SOTM mode. This may provide a smooth transition from the coasting mode to the SOTM mode. This may reduce fuel consumption of the vehicle and may improve the driveability for the driver. Embodiments of the invention may effectively increase the velocity from which SOTM mode can be entered.

The method may comprise controlling the driveline so that the driveline is reconnected if it is determined that the driveline can be reconnected within the threshold time.

This enables the driveline to reconnected or not depending on the determinations that have been made. This may improve the control of the vehicle and provide for improved fuel efficiency.

The threshold time may be the time taken for the vehicle speed to reduce to a threshold speed.

This may enable the driveline to remain disconnected if the vehicle speed would be below a threshold before the reconnection of the driveline has been completed. The threshold speed could be the speed below which SOTM mode can be entered. This provides the advantage that the driveline is not reconnected only to be immediately disconnected again. This provides for a smoother transition between the different modes and provides improved drivability for the driver.

Determining whether the driveline can be reconnected within the threshold time may comprise: obtaining information indicative of a combined braking force; obtaining information indicative of current vehicle speed; using the obtained information indicative of the combined braking force and the current vehicle speed to determine the time taken for the vehicle speed to reduce to the threshold speed; and comparing the time taken to reduce to the threshold speed to the time taken to reconnect the driveline.

The combined braking force may comprise the applied braking force which results from the braking systems within the vehicle and external braking forces such as air resistance and rolling resistance. Using information about the combined braking force may enable the time taken for the speed to be reduced to the threshold speed to be calculated. This information about the combined braking force may be obtained from sensors which are currently available in vehicles and so in some embodiments no additional sensors need to be added to a vehicle to enable the described methods to be implemented.

Determining whether the driveline can be reconnected within the threshold time may comprise: obtaining information indicative of a threshold combined braking force for the current speed of the vehicle; obtaining information indicative of the current combined braking force; and comparing the current combined braking force to the threshold combined braking force.

This may provide the advantage that the determining whether or not to reconnect the driveline is made based on the current combined braking force and there is no need to determine the time taken for the vehicle speed to reduce to a threshold. This may reduce the processing capacity required to determine whether the driveline can be reconnected within a threshold time.

The information indicative of a threshold current combined braking force may be obtained before the detection of the applied braking force.

This may reduce the processing capacity and the time taken to determine whether or not to reconnect the driveline because the threshold combined braking force is already known when the applied braking force is detected.

The threshold time may be a default threshold time.

This may reduce the processing capacity required to determine whether or not to reconnect the driveline as there is no need to calculate a threshold time.

The reconnection of the driveline may be initiated before it is determined whether the driveline can be reconnected within the threshold time and if it is determined that the driveline cannot be reconnected within the threshold time the reconnection of the driveline is terminated.

As the time taken to reconnect the driveline is much longer than the time taken to determine whether or not to reconnect the driveline the reconnection of the driveline can be initiated as soon as the applied braking force is detected. If it is then determined that the driveline is not to be reconnected the reconnection can be terminated before the reconnection is effective. Conversely if it is determined that the driveline is to be reconnected the reconnection may be completed. This would ensure that there is no delay in the reconnection of the driveline.

The method may comprise detecting a change in the applied braking force and in response to detecting the change in the applied braking force making a new determination whether the driveline can be reconnected within a threshold time.

If the applied braking force applied to the vehicle changes this may also change whether or not the driveline can be reconnected within a threshold time. Therefore, it is advantageous to enable a new determination to be made if the applied braking force changes.

Below the threshold speed the vehicle may be controlled to use a stop on the move mode of operation.

This may enable the threshold that is used to decide whether or not to reconnect the driveline to be linked to the threshold for entering a SOTM mode of operation. This may enable embodiments of the invention to be used to allow for smooth transition from a coasting state to a SOTM state.

According to an aspect of the invention there is provided an apparatus for controlling connection of a driveline within a vehicle, the apparatus comprising; means for detecting application of a braking force while the vehicle is operating in a coasting mode in which the driveline is disconnected and the vehicle speed is above a threshold speed; means for determining whether driveline can be reconnected within a threshold time; means for controlling the driveline so that the driveline is not reconnected if it is determined that the driveline cannot be reconnected within the threshold time.

According to an aspect of the invention there is provided an apparatus comprising means for enabling any of the methods described above.

According to an aspect of the invention there is provided a vehicle comprising an apparatus as described above.

According to an aspect of the invention there is provided a computer program for enabling control of a vehicle, the computer program comprising instructions that, when executed by one or more processors, cause a system to perform, at least: detecting application of a braking force while the vehicle is operating a coasting mode in which the driveline is disconnected and the vehicle speed is above a threshold speed; determining whether driveline can be reconnected within a threshold time; controlling the driveline so that the driveline is not reconnected if it is determined that the driveline cannot be reconnected within the threshold time.

According to an aspect of the invention there is provided a non-transitory computer readable media comprising a computer program as described above.

According to an aspect of the invention there is provided an apparatus comprising: means for determining whether or not a driveline should be reconnected when an application of a brake force is detected.

A system for controlling connection of a driveline within a vehicle, the system comprising: means for receiving one or more signals indicative of a value of an applied braking force where the braking force is applied while the vehicle is operating a coasting mode in which the driveline is disconnected and the vehicle is above a threshold speed;
means to determine whether the driveline can be reconnected within a threshold time based on the value(s) of the applied braking force;
means to control the driveline by leaving the driveline disconnected if it is determined that the driveline cannot be reconnected within the threshold time.

A system for controlling connection of a driveline within a vehicle as described above, wherein:

said means for receiving one or more signals each indicative of a value of an applied braking force comprises an electronic processor having an electrical input for receiving said one or more signals each indicative of a value of an applied braking force; and an electronic memory device electrically coupled to the electronic processor and having instructions stored therein, said means to determine whether the driveline can be reconnected within a threshold time based on the value(s) of the applied braking force, and said means to control the driveline by leaving the driveline disconnected comprises the processor being configured to access the memory device and execute the instructions stored therein such that it is operable to determine whether the driveline can be reconnected within a threshold time based on the value(s) of the applied braking force; and command that the driveline remains disconnected.

According to another aspect, there is provided a method of controlling connection of a driveline within a vehicle, the method comprising:

detecting or receiving an indication of a deceleration and/or brake demand while the vehicle is operating in a coasting mode in which the driveline is disconnected and the vehicle speed is above a threshold speed; and transitioning directly from the coasting mode to a stop on the move mode without reconnecting the driveline when it is determined that a time period associated with decelerating the vehicle to the threshold speed is less than a time period associated with reconnecting the driveline, wherein the coasting mode is a mode in which the driveline is disconnected while neither the accelerator nor the brake pedal are pressed by the driver and the stop on the move mode is a mode in which the driveline is disconnected while the vehicle speed is below the threshold speed and the brake pedal is depressed by the driver.

According to another aspect, there is provided a method of controlling connection of a driveline within a vehicle, the method comprising:

detecting or receiving an indication of a deceleration and/or brake demand while the vehicle is operating in a coasting mode in which the driveline is disconnected and the vehicle speed is above a threshold speed; and transitioning directly from the coasting mode to a stop on the move mode without reconnecting the driveline when the vehicle's deceleration is greater than a threshold deceleration, wherein the coasting mode is a mode in which the driveline is disconnected while neither the accelerator nor the brake pedal are pressed by the driver and the stop on the move mode is a mode in which the driveline is disconnected while the vehicle speed is below the threshold speed and the brake pedal is depressed by the driver.

The apparatus may be for controlling the connection of a driveline within a vehicle.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Examples of the present disclosure relate to methods, apparatus 11 and computer programs 27 for controlling a vehicle 1. The methods comprise: the method comprising: detecting or receiving an indication of a deceleration and/or brake demand while the vehicle is operating in a coasting mode and the vehicle speed is above a threshold speed, determining whether the driveline can be reconnected within a threshold time, and controlling the driveline so that the driveline is not reconnected if it is determined that the driveline cannot be reconnected within the threshold time. The methods alternatively comprise detecting or receiving an indication of a deceleration and/or brake demand while the vehicle is operating in a coasting mode and the vehicle speed is above a threshold speed, determining the vehicle's deceleration or receiving an indication of the vehicle's deceleration, determining a threshold deceleration, determining whether the vehicle's deceleration is greater or less than the threshold deceleration, and controlling the driveline so that the driveline is not reconnected if the vehicle's deceleration is greater than the threshold deceleration.

Figure 1:
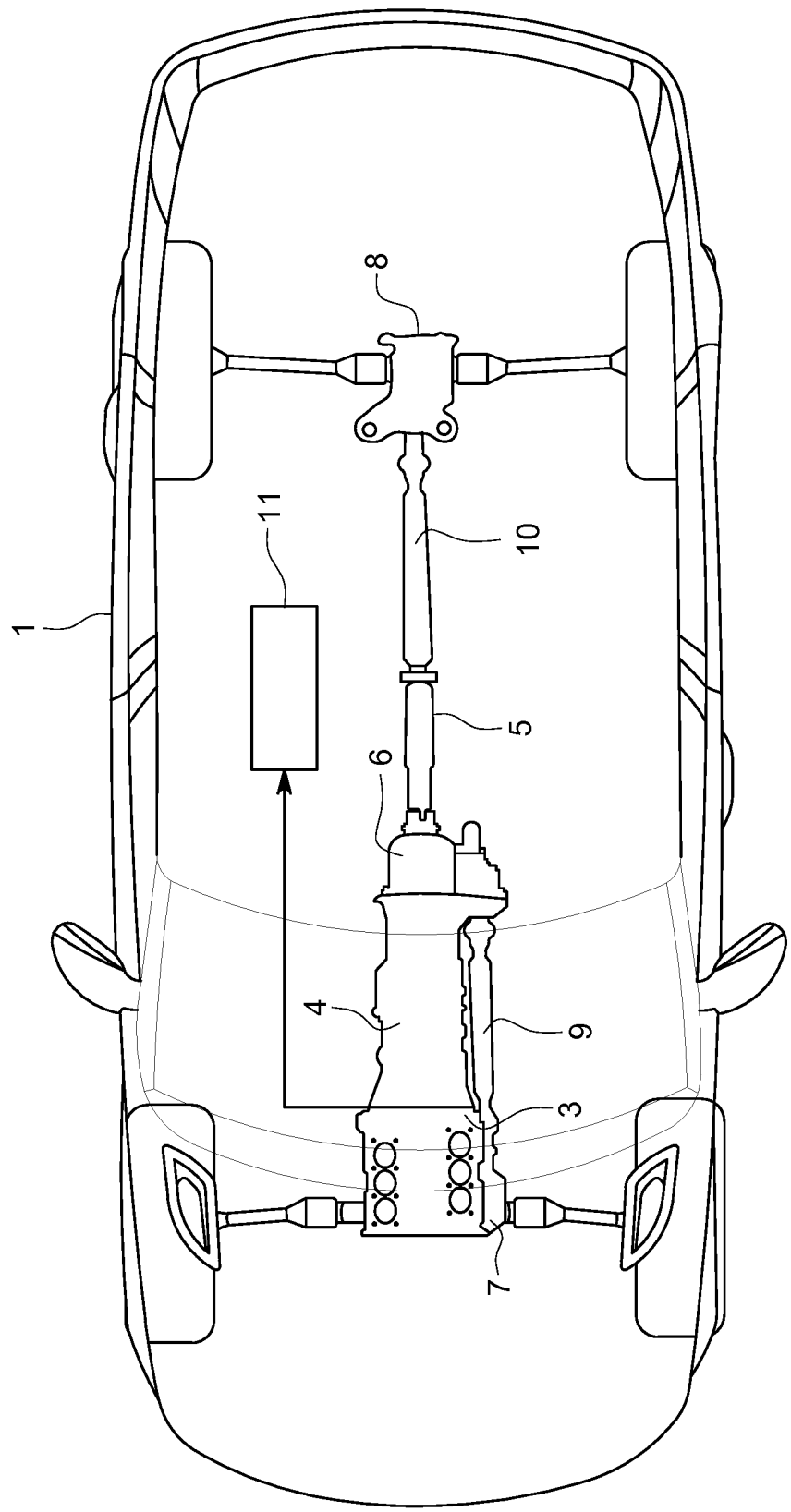
FIG. 1 illustrates an example vehicle which may comprise embodiments of the invention.

FIG. 1 illustrates an example vehicle 1 which may comprise apparatus 11 according to examples of the present disclosure. The vehicle 1 comprises a prime mover 3 and a driveline 5.

The prime mover 3 may comprise any means which may be arranged to provide a torque output for driving the vehicle 1. The prime mover 3 could comprise any suitable means for providing torque such as an internal combustion engine, an electric traction machine, a combination of an internal combustion engine and an electric traction machine or any other suitable means. In the example of FIG. 1 the prime mover 3 comprises a six-cylinder internal combustion engine. It is to be appreciated that other prime movers could be used in other embodiments of the invention. For instance, in some examples the vehicle 1 could be a hybrid electric vehicle (HEV), a mild hybrid electric vehicle (MHEV) plug-in electric vehicles (PHEV) or any other suitable type of vehicle 1.

The driveline 5 may comprise any means which may be arranged to transfer the power output provided from the prime mover 3 to the axles of the vehicle 1.

The driveline 5 may be 'in line' (North South) as shown in FIG. 1 or a 'transverse' (East West) configuration (not shown) wherein the axis of the shafts of the transmissions lay in the longitudinal or lateral directions respectively in the car. The transmission could be automatic or semi-automatic such that operation of internal clutches was convenient for automation. The driveline 5 shown in FIG. 1 is a 4-wheel drive driveline, having an 'in line' mounted prime mover 3 connected to an automated multispeed transmission 4, connected to a transfer case case 6.

The transfer case 6 may have means for splitting the power flow to deliver independent power to both the front differential 7 and rear differential 8 via the front propshaft 9 and rear propshaft 10 respectively. The transfer case 6 may have a multiple gear ratio option or it may only have a single ratio capability. The transfer case 6 may have disconnect clutches which may be necessary for gear range changes or part of a driveline disconnect system as are known in the art of active driveline systems. As an example, some driveline systems have multiple point disconnect locations which allow a driveline to disconnect and isolate complete parts of the driveline, such that the isolated portions of driveline can be brought to rest even when the vehicle is still moving.

In embodiments of the invention the driveline 5 may be disconnected from the prime mover 3 under certain driving conditions to improve the fuel efficiency of the vehicle 1. This disconnection may be achieved, for example, by opening an existing clutch in the transmission 4 which separates the prime mover 3 output from the transmission 4 and the rest of the driveline 5 in FIG. 1.

In another embodiment the driveline 5 could be disconnected from the prime mover by disconnecting a lock up clutch (not shown) situated in the torque converter which sits between the prime mover 3 and the transmission 4.

In another embodiment the driveline 5 could be disconnected from the prime mover 3 by disconnecting a clutch (not shown) within the transfer case 6. Advantageously, when the clutch is placed in the transfer case 6 then during coasting for example the prime mover 3 and transmission 4 can be brought to idle speed or stopped to maximize the reduction in spin losses during coasting. The rest of the driveline downstream of the transmission 4 including transfer case 6, propshafts 9, 10 and differentials 7,8 would still be rotating relative to road speed while the prime mover 3 and transmission 4 were at rest or idling.

In another embodiment the driveline 5 could be disconnected from the prime mover 3 by disconnecting clutches in either or both front differential 7 and rear differential 8. In this case, once the prime mover 3 was idling or stopped then it would be possible to reduce spinning losses in all components between the differentials and the prime mover 3 as those components would be rotating at a speed related to the idling speed of the prime mover or less than road speed if the prime mover is stationary.

Disconnecting the driveline 5 from the prime mover 3 while the vehicle 1 is moving may improve the fuel efficiency of the vehicle 1 because the prime mover 3 does not act as a brake on the vehicle 1. Modes in which the driveline 5 is disconnected from the prime mover 3 may be referred to as sailing modes.

In embodiments of the invention the vehicle 1 may have different sailing modes, such as gliding mode, coasting mode, stop on the move (SOTM) mode or any other suitable mode. The different modes may be available for different driving conditions of the vehicle 1. In embodiments of the invention a coasting mode may be used when the vehicle 1 is above a threshold speed and neither the accelerator nor brake pedal are pressed by the driver. A SOTM mode may be used if the vehicle 1 is travelling below the threshold speed and the brake pedal is pressed by the driver.

In some example SOTM modes the driveline 5 of the vehicle 1 will be disconnected from the prime mover 3 if the brake pedal is pressed and the vehicle is travelling below a threshold speed. In some examples the threshold speed may be 17 kph. The driveline 5 may be reconnected to the engine if the brake pedal is released. In some example SOTM modes the engine may be stopped if the speed of the vehicle drops below 1 kph, 5 kph or higher example speeds. Other threshold speeds may be used in other example SOTM modes.

In some example gliding modes the driveline 5 of the vehicle 1 will be disconnected from the engine 3 during constant acceleration where there is a throttle demand that is less than a threshold and the vehicle 1 is travelling within a threshold range of speeds. In some examples the threshold throttle demand could be less than or equal to 10%. In some examples the threshold range of speeds could be between 120 kph and 15 kph. Other threshold speeds could be used in other embodiments of the invention. In an idle gliding mode the prime mover 3 will drop to idle. In an off gliding mode the prime mover 3 may be stopped.

In some example coasting modes the driveline 5 of the vehicle 1 will be disconnected from the prime mover 3 during throttle off deceleration where the brake pedal is not pressed and the vehicle 1 is travelling within a threshold range of speeds. In some examples the threshold range of speeds could be between 160 kph and 15 kph. Other threshold speeds could be used in other embodiments of the invention. In an idle coasting mode the prime mover 3 will drop to idle. In an off coasting mode the prime mover 3 may be stopped.

The vehicle 1 also comprises an apparatus 11 which may be used to control the connection of the driveline 5 to the prime mover 3. Examples of the apparatus 11 are described below in relation to FIGS. 2 and 3. Examples of methods that may be performed by the apparatus 11 are described below in relation to FIGS. 4 to 6.

The vehicle 1 may comprise an apparatus 11. The apparatus may comprise one or more controllers. Where the apparatus comprises more than one controller the controller may collectively be used to control the connection of the driveline 5 to the prime mover 3. For the avoidance of doubt any reference to controller herein may be taken to refer to a single controller or a plurality of controllers forming an apparatus. For example, a vehicle system controller may arbitrate instructions between the prime mover 3 controller (not shown), transmission controller (not shown) and the traction controller (not shown).

It is to be appreciated that the vehicle 1 of FIG. 1 is provided as an example and that embodiments of the invention may be provided in any suitable vehicle 1.

Figure 2:
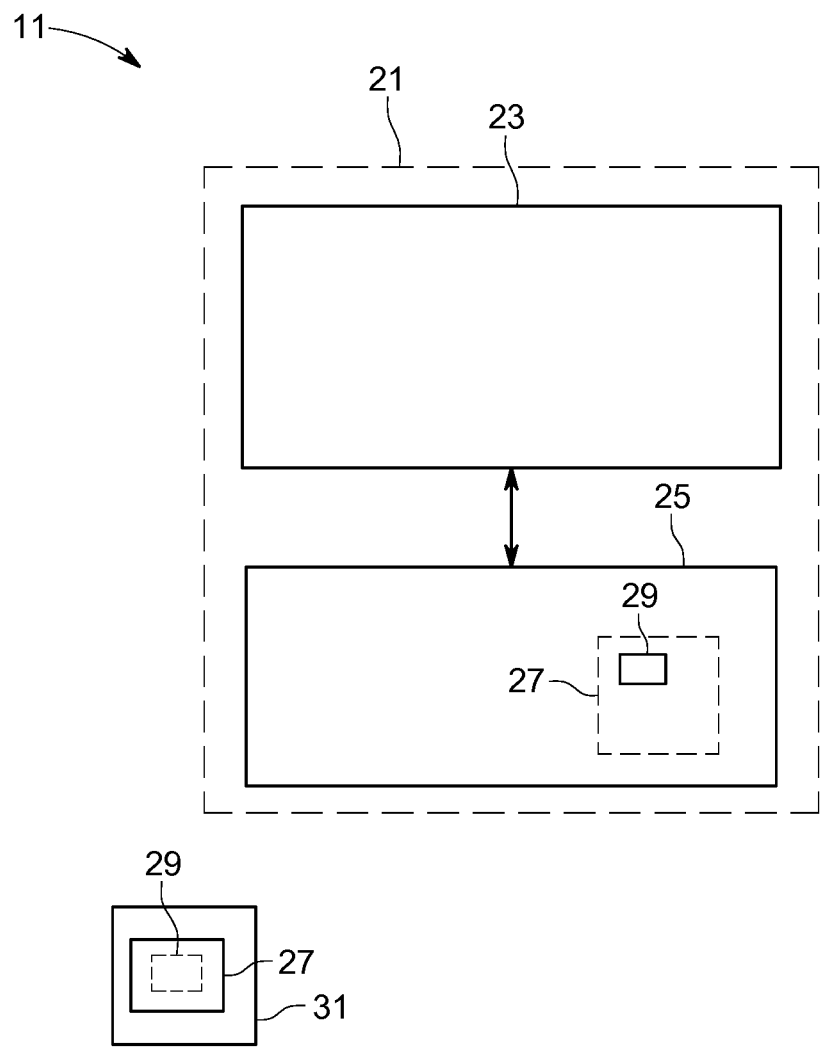
FIG. 2 illustrates an apparatus.

FIG. 2 illustrates an example apparatus 11 which may be used to control the connection of the driveline 5 to the engine 3. The apparatus 11 comprises a controller 21. The controller 21 may be a chip or a chip set. The controller 21 may form part of one or more systems 33 comprised in the vehicle 1. The controller 21 may be arranged to control the connection and disconnection of the driveline within the vehicle 1 or any other control settings of the vehicle 1.

The controller 21 comprises at least one processor 23, at least one memory 25 and at least one computer program 27.

Implementation of a controller 21 may be as controller circuitry. The controller 21 may be implemented in hardware alone, have certain aspects in software including firmware alone or can be a combination of hardware and software (including firmware).

As illustrated in FIG. 2 the controller 21 may be implemented using instructions that enable hardware functionality, for example, by using executable instructions of a computer program 27 in a general-purpose or special-purpose processor 23 that may be stored on a computer readable storage medium (disk, memory etc) to be executed by such a processor 23.

The processor 23 is arranged to read from and write to the memory 25. The processor 23 may also comprise an output interface via which data and/or commands are output by the processor 23 and an input interface via which data and/or commands are input to the processor 23.

The memory 25 stores a computer program 27 comprising computer program instructions 29 (computer program code) that controls the operation of the controller 21 when loaded into the processor 23. The computer program instructions 29, of the computer program 27, provide the logic and routines that enables the controller 21 to control the connection and disconnection of the driveline within the vehicle 1. The processor 23 by reading the memory 25 is able to load and execute the computer program 27.

As illustrated in FIG. 2, the computer program 27 may arrive at the controller 21 via any suitable delivery mechanism 31. The delivery mechanism 31 may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 27. The delivery mechanism may be a signal arranged to reliably transfer the computer program 27. The controller 21 may propagate or transmit the computer program 27 as a computer data signal.

Although the memory 25 is illustrated as a single component/circuitry it may be implemented as one or more separate components/circuitry some or all of which may be integrated/removable and/or may provide permanent/semi-permanent/dynamic/cached storage.

Although the processor 23 is illustrated as a single component/circuitry it may be implemented as one or more separate components/circuitry some or all of which may be integrated/removable. The processor 23 may be a single core or multi-core processor.

Figure 3:
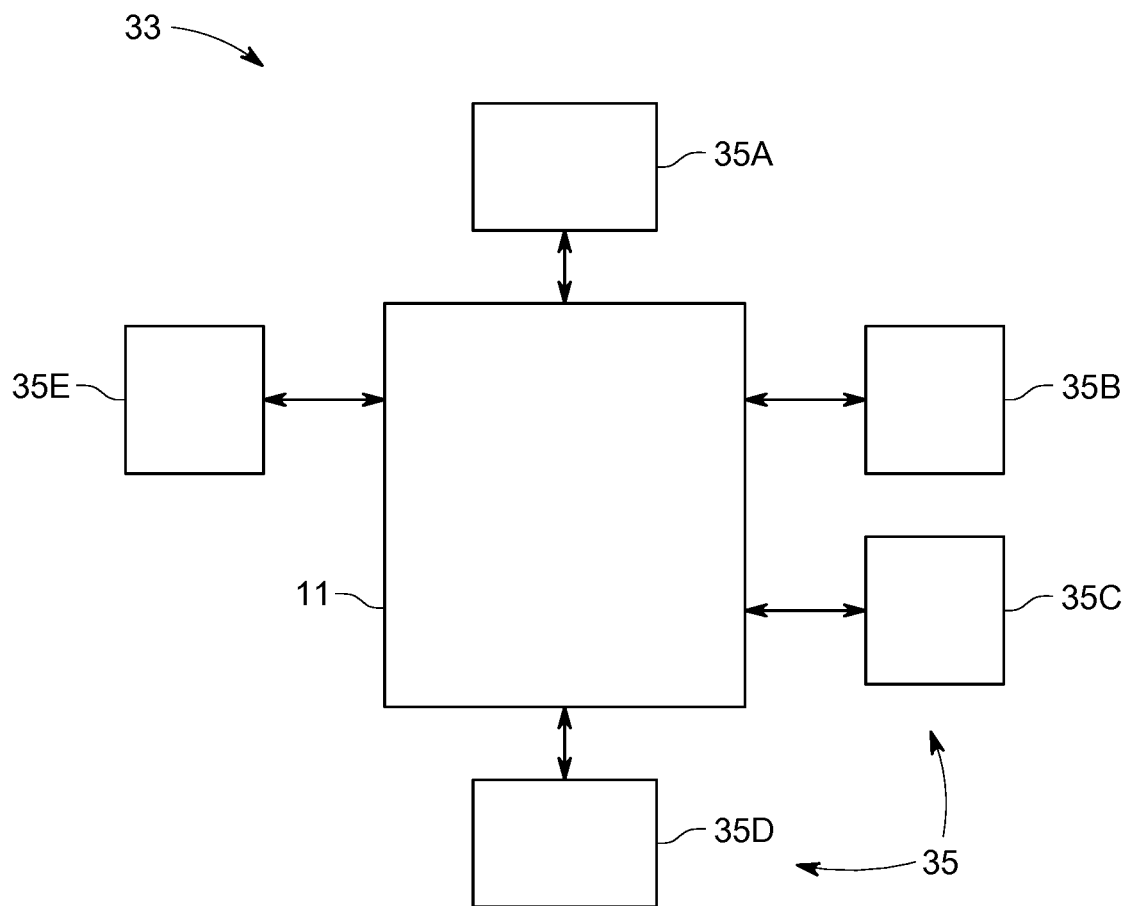
FIG. 3 illustrates an apparatus within a system.

FIG. 3 schematically illustrates an example apparatus 11 within a system 33. The system 33 may be provided within the vehicle 1. The example system 33 of FIG. 3 comprises an apparatus 11 and one or more sensors 35 which may enable the apparatus 11 to obtain information. The information which is obtained by the apparatus 11 from the one or more sensors 35 may be used by the apparatus 11 to control the connection of the driveline 5 to the prime mover 3.

The sensors 35 may comprise any means which may be configured to detect a physical parameter relating the vehicle 1 and provide an output signal to the apparatus 11 indicative of the detected parameter. The output signal may comprise information indicative of a value or magnitude of an output parameter. The apparatus and/or one or more sensors 35 may be provided within one or more other control systems such as the powertrain control module (PCM) or the vehicle supervising control module (VCM) or any other control systems. In such cases the apparatus 11 may obtain the information from the sensors 35 via the other control systems.

In embodiments of the invention the sensors 35 may comprise one or more sensors 35A for detecting the current vehicle speed. The vehicle speed sensor 35A may be positioned at any suitable position within the vehicle 1. In some examples the vehicle speed sensor 35A may be a wheel speed sensor incorporated into the wheel hub. This sensor may be an inductive sensor installed as part of an ABS braking system. In some examples the vehicle speed sensor 35A may be a sensor mounted inside the transmission 4 and in this case it could be necessary to take into account shaft speed and gear ratio selected to calculate the correct referred wheel speed and vehicle speed.

In some embodiments of the invention the sensors 35 may be arranged to obtain information which may be used to enable a deceleration of the vehicle 1 to be determined. For example, the wheel speed sensors may be used to determine vehicle speed $v_1$ at time $t_1$ and vehicle speed $v_2$ at time $t_2$. The deceleration may be calculated using the equation below:

$$\text{deceleration} = \frac{v_1 - v_2}{t_1 - t_2}$$

Alternatively, and/or additionally deceleration may be calculated using a longitudinal accelerometer.

In some examples the sensors 35 could comprise one or more sensors 35B for detecting a brake demand requested from the vehicle 1 instigated by the driver by applying pressure to the brake pedal. Such sensors 35B may be positioned in the braking pedal and measure depression of the pedal. Alternatively the sensors 35B may be positioned within a braking system to measure the pressure being applied by the brakes. The control system may have a brake pedal map calibrated to translate the hydraulic brake pressure generated by the brake pedal into an approximate brake torque demand signal.

In some examples the sensors 35 may comprise one or more sensors 35C which may be arranged to determine the current mass of the vehicle 1. For instance, the vehicle 1 may comprise one or more suspension springs and the current load within the suspension system may be monitored to determine the current mass of the vehicle 1. The deflection of the springs could be measured using any suitable means such as potentiometers as the mass of the vehicle 1 changes. Spring forces in each wheel could be calculated using f=kx, where k is the spring rate in N/mm and x is the deflection. In some examples the mass of the vehicle 1 may be determined by one or more sensors arranged to measure air suspension pressure, by using p=f/a calculations in each pneumatic cylinder or bellows system as is known.

The sensors 35 may also comprise one or more sensors 35D which provide means for detecting the angle of inclination at which the vehicle 1 is travelling. Such sensors 35D could comprise vehicle wheel sensors, accelerometers or any other suitable means. The information obtained from such sensors 35D may be used to determine whether the vehicle 1 is travelling uphill or downhill or on a flat surface. Other inclination/gradient monitoring techniques are know where actual vehicle acceleration is mapped against actual engine load and the inclination can be estimated mathematically based on vehicle progression. Combining this method with known stand alone 3 axis accelerometer gradient estimation may be beneficial.

The sensors 35 may also comprise one or more sensors 35E which comprise means for obtaining information about the current location of the vehicle 1 or other information about the current environment of the vehicle 1. For instance, information may be obtained from a navigation system, GPS, cameras and/or wireless receivers which may provide information about the current location of the vehicle 1 and/or the traffic conditions in which the vehicle 1 is travelling. Such sensors 35E could also provide means for obtaining information about the surface of the road on which the vehicle 1 is traveling. For instance, it may enable information to be obtained relating to current conditions of roads such as the weather conditions, whether or not it has been raining or if there is any surface water or any other suitable information. In some examples, information about the surface of the road could be obtained by using wheel slip information combined with obtained location information and/or other information obtained by the one or more sensors 35.

It is to be appreciated that the example sensors 35 illustrated in the system 33 are illustrated for example only and that other systems 33 may omit any of the sensors 35 described above. Similarly, other systems could comprise any different sensors 35 in addition to or instead of the sensors 35 illustrated in FIG. 3.

Figure 4:
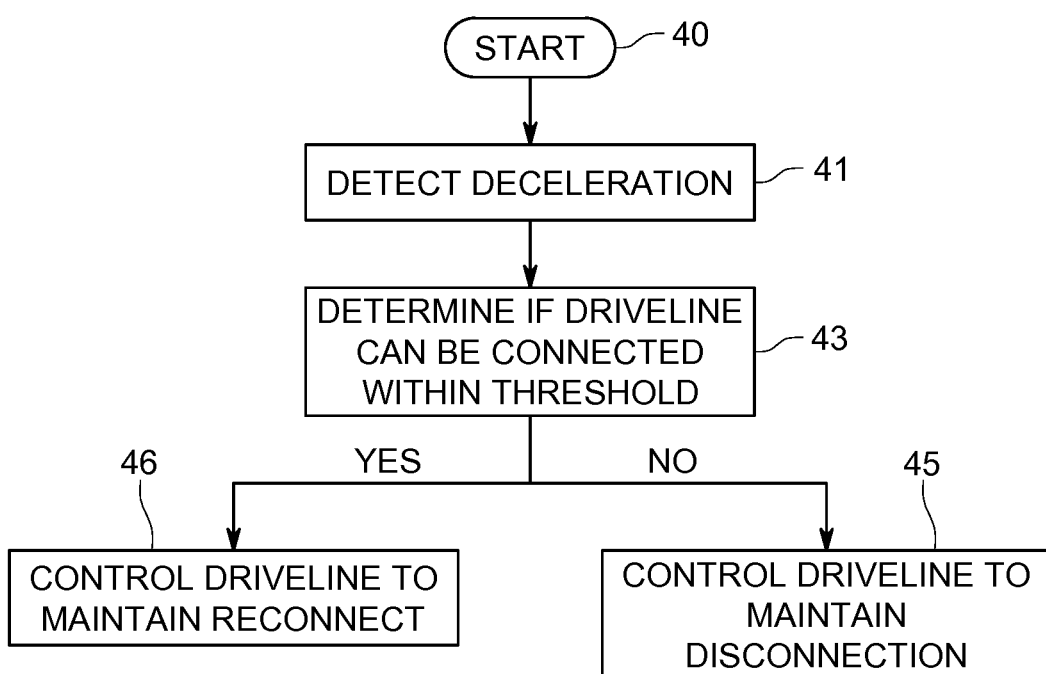
FIG. 4 illustrates a method.

FIG. 4 illustrates a method which may be implemented using a system 33 as described above. At the start (block 40), the vehicle 1 is in coasting mode i.e. the vehicle 1 is moving within a threshold range of speeds and the accelerator is not depressed. When deceleration is detected (block 41) the controller begins to reconnect the driveline. Additionally, following detection of deceleration, at block 43, it is determined whether driveline 5 can be reconnected within a reconnection threshold time. If it is determined that the driveline 5 cannot be reconnected within the reconnection threshold time, the method proceeds to block 45 and the driveline 5 is controlled so that the driveline 5 continues to be disconnected from to the prime mover 3. If it is determined that the driveline 5 can be reconnected within the threshold time, the method proceeds to block 46 and the driveline 5 is controlled so that the driveline 5 is reconnected to the prime mover 3.

Figure 5:
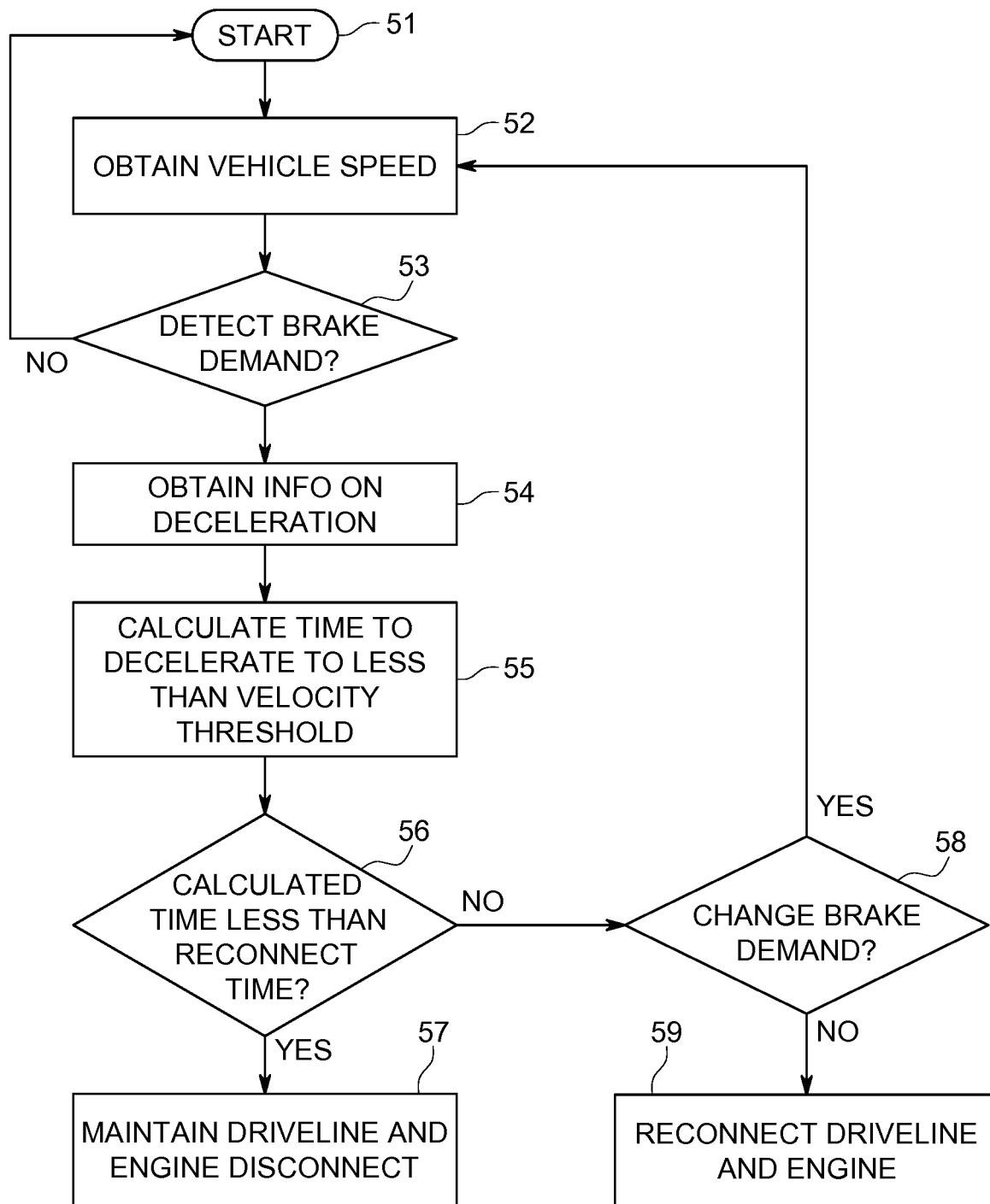
FIG. 5 illustrates another method.
Figure 6:
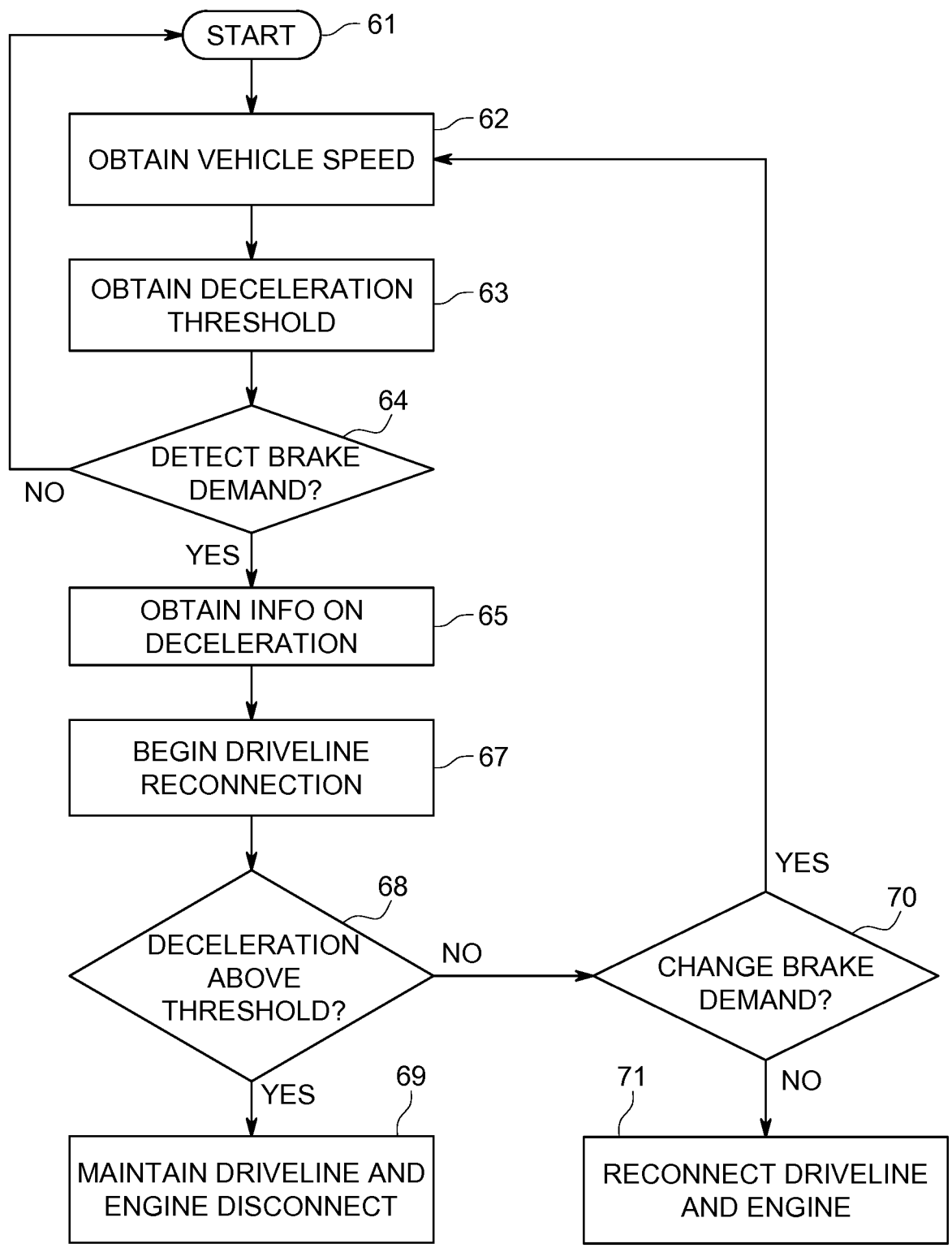
FIG. 6 illustrates another method.

FIGS. 5 and 6 illustrate example methods in more detail. The methods of FIGS. 5 and 6 could be implemented using the system 33 described above.

The method starts (block 51) in the example method of FIG. 5 when the vehicle 1 is travelling in a coasting mode. In the coasting mode it is usual for the driveline 5 to be disconnected from the prime mover 3. The vehicle 1 is travelling above a threshold speed and the user is not actuating either the accelerator pedal or the brake pedal.

The threshold speed may be the cut-off speed for entering SOTM modes of operation. The cut-off speed for entering SOTM modes of operation may depend on the type of prime mover 3 used and the arrangement of components, such as the transmission, within the driveline 5. The cut-off speed for entering SOTM modes of operation could be approximately 20 kph or any other suitable speed for example. Other threshold speeds may be used in other embodiments of the invention.

At block 52 information indicative of the current vehicle speed is obtained by the apparatus 11. The information indicative of the current vehicle speed may be obtained from a sensor 35A. The sensors 35A could be part of another control system within the vehicle 1.

At block 53 it is determined whether or not brake demand has been requested. A brake demand request may occur in response to a user actuating a brake pedal or initiating any other braking system within the vehicle 1.

If no brake demand occurs then the method returns to the start (block 51) and the apparatus 11 continues to obtain information about the current vehicle speed periodically. Information about the current vehicle speed may be obtained at regular time intervals or any other suitable time interval.

If a brake demand has been requested then the method proceeds to block 54 and information indicative of the current deceleration of the vehicle 1 is obtained. The information indicative of the deceleration may be obtained from one or more sensors 35 within the vehicle 1 and deceleration may be calculated as described previously or using any other suitable method.

One possible method of calculating deceleration will now be described. For instance, the deceleration may result from a brake demand Information indicative of the applied braking force may be obtained from one or more sensors 35B within braking systems of the vehicle 1. The information indicative of the applied braking force may comprise information indicative of a magnitude of the applied braking force.

The sensor 35B may be a brake pressure sensor measuring brake fluid pressure and the apparatus 11 (would this include brake controller?) could have a brake pressure map configured to estimate applied braking force on the vehicle, based on modelled data for the vehicle. Optionally a direct actual deceleration could be measured from an accelerometer in real time in response to brake pedal application by the driver.

The deceleration may also comprise components due to external conditions such as air resistance, rolling resistance and any gravitational forces due to the gradient at which the vehicle is travelling. A dynamic vehicle model estimator can be utilised within apparatus 11 to estimate accurately these effects on the vehicles deceleration over time, or direct accelerometer measurements could take this into account in real time. One or more sensors 35 within the vehicle 1 may provide the apparatus 11 with information indicative of each these components and/or with information which enables these components to be calculated. For example, each vehicle model may have its own dedicated model configuration data built into the deceleration estimator including weight, co-efficient of drag, frontal area, speed related driveline losses and other vehicle parameters.

As examples, air resistance causing deceleration on a vehicle versus speed may be estimated based on a body shape, e.g. a coefficient of drag CD) multiplied by vehicle frontal area, proportional to velocity squared, equates to a resistance force as is known.

Frictional losses on mechanical components may be mapped during component development to produce maps which give good estimates of running losses versus torque and speed at various temperatures. These maps can be built into the warmup software of a vehicle to complement a vehicle control strategy. Components such as transmissions, differentials can be mapped independently or a whole driveline including all shafts can be tested at once as an assembly. Losses inside vehicle components may be broken down into static and dynamic losses, e.g., some losses are losses required to overcome component stiction and then additional losses may be due to dynamic losses proportional to torque transmission or fluid pumping loss rate proportional to speed of shafts and gears.

At block 55 the apparatus 11 uses the obtained information indicative of the current vehicle speed and the obtained information related to the deceleration of the vehicle to determine the time it will take for the vehicle speed to reduce to the threshold speed.

The time taken for the vehicle speed to reduce to the threshold speed may be given by $$t = \frac{v - u}{a}$$

Where t is the time, v is the threshold speed, u is the current vehicle speed and a is the deceleration of the vehicle 1.

Optionally, at the same time as performing the steps of block 55 reconnection of the driveline 5 may be initiated. This is because this reduces the time taken to reconnect the driveline if a decision is made that the driveline should be reconnected.

At block 56 it is determined whether or not the calculated time is less than the reconnection threshold time where the reconnection threshold time is a predetermined time period equal or more than the time required to reconnect the driveline 5 to the prime mover. This determination may be made by comparing the time taken to reduce the vehicle speed to the threshold speed to the reconnection threshold time.

If it is determined that the reconnection threshold time is greater than the time taken to reduce the vehicle speed to the threshold speed then the driveline 5 cannot be reconnected before the vehicle speed reduces to the threshold speed. In such cases, at block 57, the apparatus 11 controls the driveline 5 so that the driveline 5 is not reconnected to the prime mover 3. Thus, the disconnection between the prime mover 3 and the driveline 5 is maintained. This may allow, for example, the vehicle 1 to transition from the coasting mode to a SOTM mode without the driveline 5 being reconnected.

However, if at block 56 it is determined that the reconnection threshold time is less than the time taken to reduce the vehicle speed to the threshold speed then the driveline 5 can be reconnected to the prime mover 3 before the vehicle speed reduces to the threshold speed. In such cases the method proceeds to block 58. At block 58 it is determined whether or not there is a change in the brake demand. For instance, a user may change how hard they are pressing the brake pedal.

If, at block 58, no change to the brake demand is detected then, at block 59 the apparatus 11 controls the driveline 5 so that the driveline 5 and prime mover 3 are reconnected. However, if a change to the brake demand is detected then the method returns to block 52 to begin the method again. Optionally, the method is effected immediately without waiting for a time period to elapse.

The method of FIG. 5 enables the disconnection of the driveline to be maintained as the vehicle transitions from a coasting mode to an SOTM mode based on calculations relating to the vehicle speed and deceleration of the vehicle.

FIG. 6 illustrates another method that may be used in embodiments of the invention. At the start of the method (block 61) of FIG. 6 the vehicle 1 is travelling in a coasting mode as described above.

At block 62 information indicative of the current vehicle speed is obtained by the apparatus 11. The information indicative of the current vehicle speed may be obtained from a sensor 35A. The sensor 35A could be part of another control system within the vehicle 1.

At block 63 information indicative of a threshold deceleration for the current vehicle speed may be obtained. In some examples the information indicative of the threshold deceleration may be obtained by calculating the deceleration required to reduce the vehicle speed from the current speed to the threshold speed within a reconnection threshold time. The threshold speed may be the speed at which SOTM modes may be activated.

In some examples the information indicative of the threshold deceleration may be obtained by accessing a database such as a lookup table or any other suitable database. The database may store information indicative of the threshold decelerations for given speeds and given vehicle conditions such as the mass of the vehicle 1 and the surface over which the vehicle 1 is travelling. The look up table may also take into account factors such as inclination at which the vehicle 1 is travelling, frictional losses, component temperatures or any other suitable factors. Several lookup tables may need to be evaluated and taken into account to calculate total deceleration forces acting on the vehicle, e.g., separate loss maps may exist for transmission, transfer case, front and rear differentials, summated bearing shaft losses for the system may also be estimated. These tables could be estimated during component testing and development or could be based on empirical values.

In some examples the information indicative of the threshold deceleration may be obtained before a brake demand is detected. For example, the threshold deceleration may be determined periodically and stored in a memory. Alternatively, the threshold deceleration may be determined when the vehicle speed passes a predetermined vehicle speed. This may enable the determination as to whether to reconnect the driveline 5 and prime mover 3 to be made more quickly.

At block 64 it is determined whether or not a brake demand has been detected. The brake demand may be in response to the driver actuating the brake pedal. If a brake demand is not detected then the method returns to the start (block 61) and continues to obtain information about the current vehicle speed and the deceleration threshold at predetermined time intervals.

If a brake demand is detected then information indicative of the current deceleration is obtained by the apparatus 11 at block 65 as described with reference to block 54 in FIG. 5. The information indicative of contributing factors to the deceleration may be obtained from one or more sensors 35 within the vehicle 1.

In the method of FIG. 6 the information indicative of the deceleration may be obtained in response to the detection of the brake demand Information indicative of other components contributing to deceleration of the vehicle could also be obtained upon detection of a brake demand. For instance, information indicative of the friction and air resistance may be obtained at regular intervals. This information may then be retrieved at block 65.

At block 67, which may begin at the same time as block 65, reconnection of the driveline 5 is initiated. The reconnection of the driveline may be initiated before the decision as to whether the driveline 5 should be reconnected is made. The time taken to make the decision may be much longer than the time taken to reconnect the driveline 5. This reduces the time taken to reconnect the driveline if a decision is made that the driveline should be reconnected. Conversely if the decision is to not reconnect the driveline 5 then the process of connecting the driveline 5 can be terminated before it is completed. The skilled person will understand that reconnection of the driveline at this time is optional and initiation of reconnection may be delayed until after the vehicle is stationary or begins moving after being stationary.

At block 68 it is determined whether or not the current deceleration is above or below the deceleration threshold. This determination may be made by comparing the deceleration obtained at block 65 with the deceleration threshold obtained at block 63.

If it is determined that the vehicle's deceleration is greater than the deceleration threshold then the driveline 5 cannot be reconnected to the prime mover 3 before the vehicle speed reduces to the threshold speed. In such cases, at block 69, the apparatus 11 controls the driveline 5 so that the driveline 5 is not reconnected to the prime mover 3. The reconnection of the driveline 5 which was initiated at block 67 is terminated. The disconnection between the prime mover 3 and the driveline 5 is maintained so that the vehicle 1 can transition from the coasting mode to an SOTM mode without the driveline 5 being reconnected.

If at block 68 it is determined that the deceleration is less than the deceleration threshold then the driveline 5 can be reconnected before the vehicle speed reduces to the threshold speed. In such cases the method proceeds to block 70. At block 70 it is determined whether or not there is change in the brake demand.

If, at block 70, no change to the brake demand has occurred then, at block 71 the apparatus 11 controls the driveline so that the driveline 5 is reconnected. However, if a change to the brake demand is detected then the method returns to block 62 and a new vehicle speed and deceleration threshold is obtained. This enables a new determination to be made as to whether or not to reconnect the driveline and prime mover 3 based on the new brake demand.

The blocks illustrated in FIGS. 4 to 6 may represent steps in a method and/or sections of code in the computer program 27. The illustration of a particular order to the blocks does not necessarily imply that there is a required or preferred order for the blocks and the order and arrangement of the block may be varied. Furthermore, it may be possible for some steps to be omitted.

It is to be appreciated that modifications may be made to the example methods. For instance, in the examples described above a threshold time is calculated based on the time it would take for the vehicle speed to reduce to a threshold speed. In other examples the threshold time may be a default threshold time. A plurality of different thresholds may be available for different conditions of the vehicle 1. The different conditions of the vehicles could be speed ranges, weather conditions, locations, traffic conditions or any other suitable conditions.

In a further example, reconnection of the driveline, as described with reference to block 67 of FIG. 6, may not be initiated until it has been determined that the driveline should be reconnected for example at block 59 or 71.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A method of controlling connection of a driveline within a vehicle, the method comprising:
   detecting or receiving an indication of a deceleration and/or brake demand while the vehicle is operating in a coasting mode in which the driveline is disconnected and a vehicle speed is above a threshold speed;
   determining whether the driveline can be reconnected within a threshold time; and
   controlling the driveline so that the driveline is not reconnected if it is determined that the driveline cannot be reconnected within the threshold time.

2. A method according to claim 1 comprising controlling the driveline so that the driveline is reconnected if it is determined that the driveline can be reconnected within the threshold time.

3. A method according to claim 1 wherein the threshold time is the time taken for the vehicle speed to reduce to the threshold speed.

4. A method as claimed in claim 3 wherein determining whether the driveline can be reconnected within the threshold time comprises:
   obtaining information indicative of a current brake demand;
   obtaining information indicative of current vehicle speed;
   using the obtained information indicative of the current brake demand and the current vehicle speed to determine the time taken for the vehicle speed to reduce to the threshold speed; and
   comparing the time taken to reduce to the threshold speed to the time taken to reconnect the driveline.

5. A method as claimed in claim 3 wherein determining whether the driveline can be reconnected within the threshold time comprises:
   obtaining information indicative of a current deceleration;
   obtaining information indicative of current vehicle speed;
   using the obtained information indicative of the current deceleration and the current vehicle speed to determine the time taken for the vehicle speed to reduce to the threshold speed; and
   comparing the time taken to reduce to the threshold speed to the time taken to reconnect the driveline.

6. A method according to claim 1 wherein the threshold time is a default threshold time.

7. A method according to claim 1 wherein the reconnection of the driveline is initiated before it is determined whether the driveline can be reconnected within the threshold time and if it is determined that the driveline cannot be reconnected within the threshold time the reconnection of the driveline is terminated.

8. A method according to claim 1 comprising detecting a change in a brake demand or receiving an indication of a change in the brake demand and, in response, making a new determination whether the driveline can be reconnected within a threshold time.

9. A method as claimed in claim 1, wherein the threshold time is a time period associated with decelerating the vehicle to the threshold speed, and the step of determining comprises comparing the threshold time with a time period associated with reconnecting the driveline.

10. A method as claimed in claim 9, comprising transitioning directly from the coasting mode to a stop on the move mode when it is determined that the time period associated with decelerating the vehicle to the threshold speed is less than the time period associated with reconnecting the driveline, wherein the coasting mode is a mode in which the driveline is disconnected while neither the accelerator nor the brake pedal are pressed by the driver and the stop on the move mode is a mode in which the driveline is disconnected while the vehicle speed is below the threshold speed and the brake pedal is depressed by the driver.

11. An apparatus for controlling connection of a driveline within a vehicle, the apparatus comprising:

means for detecting a deceleration and/or brake demand while the vehicle is operating in a coasting mode in which the driveline is disconnected and a vehicle speed is above a threshold speed or means for receiving an indication of a deceleration and/or brake demand while the vehicle (1) is operating in the coasting mode and the vehicle speed is above the threshold speed;

means for determining whether the driveline can be reconnected within a threshold time;

means for controlling the driveline so that the driveline is not reconnected if it is determined that the driveline cannot be reconnected within the threshold time.

12. An apparatus as claimed in claim 11 comprising means for controlling the driveline so that the driveline is reconnected if it is determined that the driveline can be reconnected within the threshold time.

13. An apparatus as claimed in claim 11 wherein the threshold time is the time taken for the vehicle speed to reduce to a threshold speed.

14. An apparatus as claimed in claim 13 wherein the means for determining whether the driveline can be reconnected within the threshold time comprises:

means for receiving information indicative of a current brake demand;

means for receiving information indicative of current vehicle speed;

means for using the obtained information indicative of the current brake demand and the current vehicle speed to determine the time taken for the vehicle speed to reduce to the threshold speed; and means for comparing the time taken to reduce to the threshold speed to the time taken to reconnect the driveline.

15. An apparatus as claimed in claim 13 wherein the means for determining whether the driveline can be reconnected within the threshold time comprises:

means for receiving information indicative of a current deceleration;

means for receiving information indicative of the current vehicle speed; and means for using the obtained information indicative of the current deceleration and the current vehicle speed to determine the time taken for the vehicle speed to reduce to the threshold speed; and means for comparing the time taken to reduce to the threshold speed to the time taken to reconnect the driveline.

16. An apparatus as claimed in claim 11 wherein the threshold time is a default threshold time.

17. An apparatus as claimed in claim 11 wherein means for controlling the driveline is arranged so that the reconnection of the driveline is initiated before it is determined whether the driveline can be reconnected within the threshold time and if it is determined that the driveline cannot be reconnected within the threshold time the reconnection of the driveline is terminated.

18. An apparatus as claimed in claim 11 comprising means for detecting a change in the brake demand or means for receiving an indication of a change in a brake demand and, in response, making a new determination whether the driveline can be reconnected within a threshold time.

19. A non-transitory, computer-readable storage medium comprising instructions that, when executed by one or more processors, cause a system to:

detect or receive an indication of a deceleration and/or brake demand while a vehicle is operating in a coasting mode in which a driveline of the vehicle is disconnected and a speed of the vehicle is above a threshold speed;

determine whether the driveline can be reconnected within a threshold time; and control the driveline so that the driveline is not reconnected if the driveline cannot be reconnected within the threshold time.

* * * * *